United States Patent
Xu et al.

(10) Patent No.: US 12,347,890 B2
(45) Date of Patent: Jul. 1, 2025

(54) SECONDARY BATTERY, BATTERY MODULE, AND DEVICE USING SECONDARY BATTERY AS POWER SUPPLY

(71) Applicant: CONTEMPORARY AMPEREX TECHNOLOGY (HONG KONG) LIMITED, Hong Kong (CN)

(72) Inventors: Hu Xu, Fujian (CN); Yuanbao Chen, Fujian (CN); Long Xu, Fujian (CN); Jiao Dong, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 464 days.

(21) Appl. No.: 17/826,466

(22) Filed: May 27, 2022

(65) Prior Publication Data
US 2022/0285795 A1 Sep. 8, 2022

Related U.S. Application Data

(63) Continuation of application No. PCT/CN2020/141780, filed on Dec. 30, 2020.

(30) Foreign Application Priority Data

Mar. 12, 2020 (CN) .......................... 202020306566.8

(51) Int. Cl.
*H01M 50/533* (2021.01)
*H01M 50/204* (2021.01)
(Continued)

(52) U.S. Cl.
CPC ....... *H01M 50/533* (2021.01); *H01M 50/204* (2021.01); *H01M 50/249* (2021.01);
(Continued)

(58) Field of Classification Search
CPC ............ H01M 50/533; H01M 50/249; H01M 50/59; H01M 50/547; H01M 50/204; H01M 2220/20
(Continued)

(56) References Cited

U.S. PATENT DOCUMENTS

| 10,818,886 B1 | 10/2020 | Chen |
| 2020/0144584 A1 | 5/2020 | Zeng et al. |

(Continued)

FOREIGN PATENT DOCUMENTS

| CN | 209029463 U | * | 6/2019 | |
| CN | 209056523 U | * | 7/2019 | ............ H01M 10/04 |

(Continued)

OTHER PUBLICATIONS

CN209056523U (machine translation) (Year: 2019).*
CN209029463U (machine translation) (Year: 2019).*
International Search Report dated Mar. 31, 2021 issued in PCT/CN2020/141780.
(Continued)

*Primary Examiner* — Matthew T Martin
*Assistant Examiner* — Paul Christian St Wyrough
(74) *Attorney, Agent, or Firm* — Scully, Scott, Murphy & Presser, P.C.

(57) ABSTRACT

This application provides a secondary battery, a battery module, and a device using a secondary battery as a power supply. The secondary battery includes an electrode assembly, a cap assembly, and current collection members. The electrode assembly includes a main body and tabs that extend from the main body. The cap assembly includes a cap plate, electrode terminals, and an insulation baffle. The electrode terminals are disposed on the cap plate. The insulation baffle is connected to a side of the cap plate, where the side is close to the main body. The current collection members are at least partly located between the insulation (Continued)

baffle and the main body, and each of the current collection members includes a tab connection portion connected to one of the tabs. The insulation baffle contains a first recess.

10 Claims, 6 Drawing Sheets

(51) Int. Cl.
*H01M 50/249* (2021.01)
*H01M 50/547* (2021.01)
*H01M 50/59* (2021.01)

(52) U.S. Cl.
CPC ......... *H01M 50/547* (2021.01); *H01M 50/59* (2021.01); *H01M 2220/20* (2013.01)

(58) Field of Classification Search
USPC .......................................................... 429/99
See application file for complete search history.

(56) References Cited

U.S. PATENT DOCUMENTS

| 2020/0144585 | A1 | 5/2020 | Zeng et al. |
| 2020/0220134 | A1* | 7/2020 | Guen |
| 2020/0365838 | A1 | 11/2020 | Chen |
| 2021/0043887 | A1 | 2/2021 | Chen |

FOREIGN PATENT DOCUMENTS

| CN | 209766578 U | 12/2019 |
| CN | 111162205 A | 5/2020 |
| CN | 211629211 U | 10/2020 |
| JP | 6455081 B2 | 1/2019 |
| KR | 20190143013 A | 12/2019 |
| WO | 2018212447 A1 | 11/2018 |

OTHER PUBLICATIONS

Extended European Search Report dated Nov. 24, 2022 received in European Patent Application No. EP 20924689.1.

* cited by examiner

SECONDARY BATTERY, BATTERY MODULE, AND DEVICE USING SECONDARY BATTERY AS POWER SUPPLY

CROSS-REFERENCE TO RELATED APPLICATIONS

This application is a continuation of International Application No. PCT/CN2020/141780, filed on Dec. 30, 2020, which claims priority to Chinese Patent Application No. 202020306566.8, filed on Mar. 12, 2020. The disclosures of the aforementioned applications are hereby incorporated by reference in their entireties.

TECHNICAL FIELD

This application relates to the field of batteries, and in particular, to a secondary battery, a battery module, and a device using a secondary battery as a power supply.

BACKGROUND

A secondary battery such as a lithium-ion battery is widely used in electronic devices such as a mobile phone and a notebook computer by virtue of a high energy density and environmental friendliness. In recent years, in order to cope with environmental issues, gasoline price issues, and energy storage issues, the application of lithium-ion batteries has been rapidly expanded to hybrid electric vehicles, ships, and energy storage systems.

A secondary battery includes an electrode assembly, a cap assembly, and current collection members. The electrode assembly includes a main body and tabs extending from the main body. The cap assembly includes a cap plate, an insulation baffle, and electrode terminals. Each of the current collection members connects a tab and an electrode terminal. The insulation baffle is connected between the cap plate and the current collection members, thereby reducing short-circuit risks caused by a contact between the current collection members and the cap plate.

However, the insulation baffle occupies space inside the secondary battery and reduces the energy density of the secondary battery.

SUMMARY

In view of the problems in the background technologies, an objective of this application is to provide a secondary battery, a battery module, and a device using a secondary battery as a power supply to increase an energy density and reduce short-circuit risks.

To achieve the foregoing objective, this application provides a secondary battery. The secondary battery includes an electrode assembly, a cap assembly, and current collection members. The electrode assembly includes a main body and tabs that extend from the main body. The cap assembly includes a cap plate, electrode terminals, and an insulation baffle. The electrode terminals are disposed on the cap plate. The insulation baffle is connected to a side of the cap plate, where the side is close to the main body. The current collection members are at least partly located between the insulation baffle and the main body. Each of the current collection members includes a tab connection portion connected to one of the tabs. The insulation baffle contains a first recess. The first recess is recessed against a lower surface of the insulation baffle away from the main body, and the tab connection portion is at least partly accommodated in the first recess.

In a secondary battery according to some embodiments, the current collection member further includes a terminal connection portion. The terminal connection portion is connected to the electrode terminals. Both the terminal connection portion and the tab connection portion are flat plate structures. The tab connection portion is farther away from the main body than the terminal connection portion.

In a secondary battery according to some embodiments, the tab is connected to a side of the tab connection portion, where the side is close to the main body.

In a secondary battery according to some embodiments, a gap exists between the tab connection portion and a bottom face of the first recess.

In a secondary battery according to some embodiments, the current collection member further includes a tilt portion. The tilt portion is connected between the terminal connection portion and the tab connection portion. The tilt portion tilts against the terminal connection portion away from the main body.

In a secondary battery according to some embodiments, the terminal connection portion is parallel to the tab connection portion.

In a secondary battery according to some embodiments, the terminal connection portion includes a fixing region and a fuse region. The fixing region is connected to the electrode terminals. The fuse region is connected between the fixing region and the tilt portion.

In a secondary battery according to some embodiments, the current collection member further includes an insulation strip that wraps around the fuse region. A part of the insulation strip is accommodated in the first recess. A surface that is of the insulation strip and that is away from the main body is closer to the main body than a surface that is of the tab connection portion and that is away from the main body.

This application further provides a battery module. The battery module includes the secondary battery described above. The secondary battery is plural in number.

This application further provides a device using a secondary battery as a power supply. The device includes the secondary battery described above.

Beneficial effects of this application are as follows: By disposing the first recess, this application downsizes the insulation baffle, reduces the space occupied by the insulation baffle in the secondary battery, and increases the energy density of the secondary battery. The tab connection portion is at least partly accommodated in the first recess, thereby increasing a distance between the tab connection portion and the main body, providing more space for the tabs, reducing the risks of inserting the tabs into the main body, avoiding short circuits, and improving safety performance.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

The drawings are not drawn to scale.

REFERENCE NUMERALS

1: Electrode assembly;
11: Main body;
12: Tab;
121: First part;
122: Second part;
13: Positive electrode plate;
14: Negative electrode plate;
15: Separator;
2: Housing;
3: Top cover assembly;
31: Top cover plate;
311: Exhaust hole;
32: Electrode terminal;
33: Insulation baffle;
331: Lower surface;
332: First recess;
333: First bulge;
334: Upper surface;
335: Second recess;
336: Second bulge;
34: Rupture disk;
4: Current collection member;
41: Terminal connection portion;
411: Fixing region;
412: Fuse region;
413: Fuse hole;
42: Tab connection portion;
421: Connection sub-portion;
422: Confluence portion;
43: Tilt portion;
44: Insulation strip;
1000: Secondary battery;
X: Length direction;
Y: Thickness direction; and
Z: Height direction.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Figure 1:
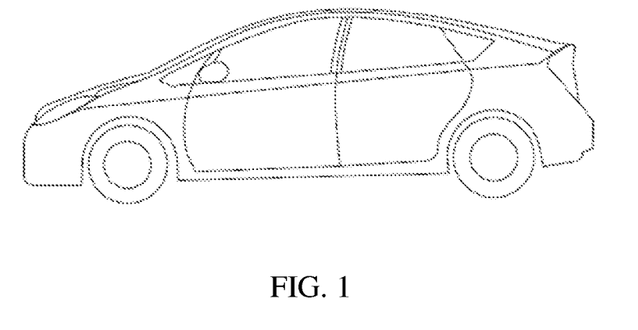
FIG. 1 is a schematic diagram of a device using a secondary battery as a power supply according to some embodiments.

This application provides a device using a secondary battery as a power supply. The device is an electric vehicle, a hybrid electric vehicle, a ship, or the like. Referring to FIG. 1, in some embodiments, the device is an electric vehicle. The electric vehicle is a battery electric vehicle, or a hybrid electric vehicle, or a range-extended electric vehicle. The electric vehicle includes a chassis, a body, and an electrical drive system. The electrical drive system includes a drive module and a power module. The drive module includes structures such as a motor, a mechanical transmission mechanism, and wheels. The power module includes a plurality of secondary batteries. The power module uses the motor and the mechanical transmission mechanism to drive the wheels to rotate, thereby driving the electric vehicle to move. The secondary battery is a lead-acid battery, a nickel-cadmium battery, a nickel-hydrogen battery or a lithium-ion battery. In some optional embodiments, the secondary battery is a lithium-ion battery.

Figure 2:
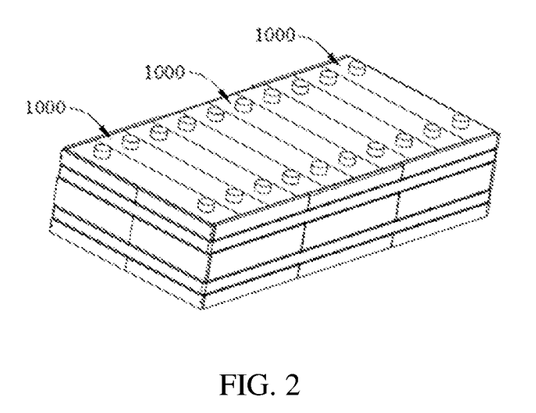
FIG. 2 is a schematic diagram of a battery module according to some embodiments.

This application further provides a battery module. Referring to FIG. 2, the battery module includes a plurality of secondary batteries 1000. In some embodiments, the plurality of secondary batteries 1000 are arranged sequentially. The battery module further includes two end plates and two side plates. The two end plates are located at two ends of the plurality of secondary batteries 1000 along an arrangement direction respectively. The two side plates are located at two sides of the plurality of secondary batteries 1000 respectively. The two end plates and the two side plates are connected together to form a quasi-rectangular frame structure. The frame structure supports and fixes the plurality of secondary batteries 1000.

Figure 3:
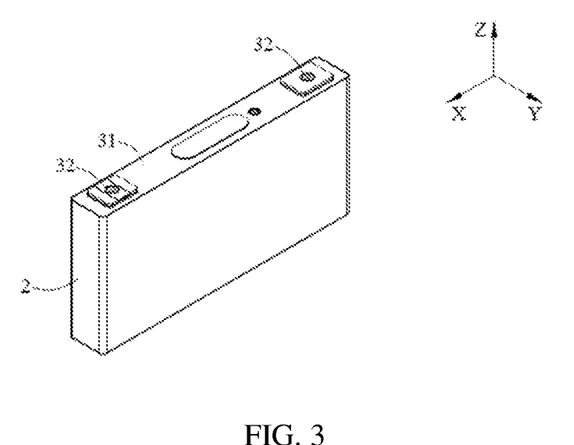
FIG. 3 is a schematic diagram of a secondary battery according to some embodiments.
Figure 4:
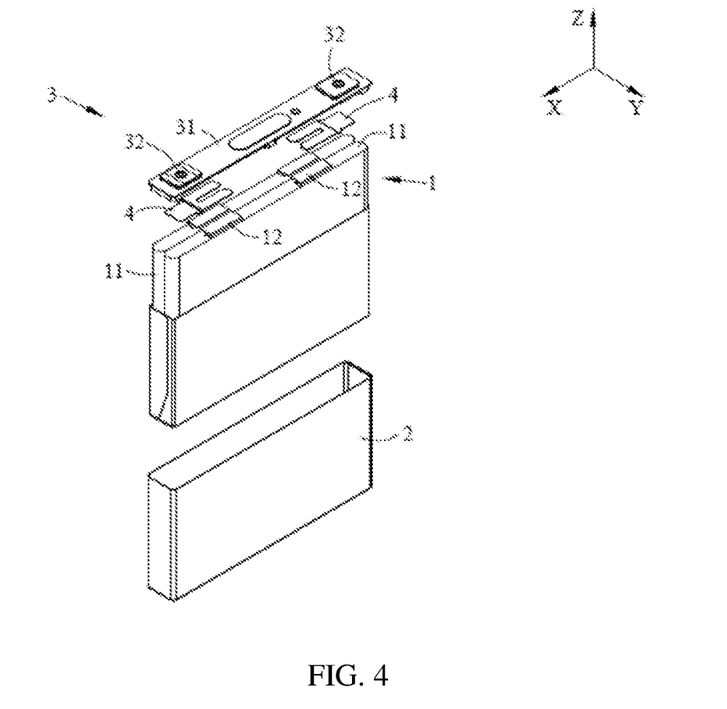
FIG. 4 is an exploded view of the secondary battery shown in FIG. 3.

This application further provides a secondary battery. Referring to FIG. 3 and FIG. 4, a secondary battery according to some embodiments includes an electrode assembly 1, a housing 2, a cap assembly 3, and current collection members 4.

Figure 5:
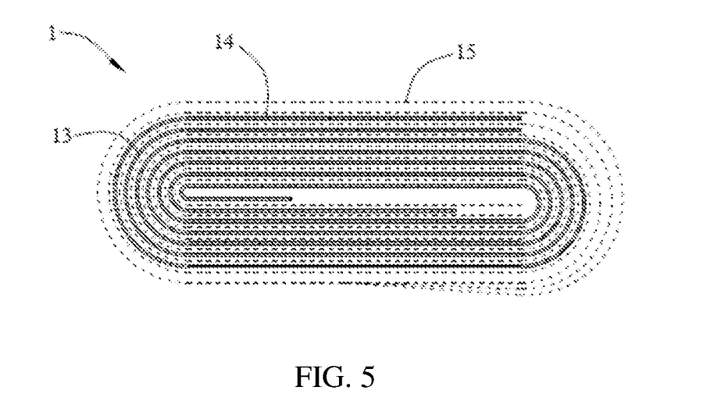
FIG. 5 is a sectional view of an electrode assembly of a secondary battery according to some embodiments.
Figure 6:
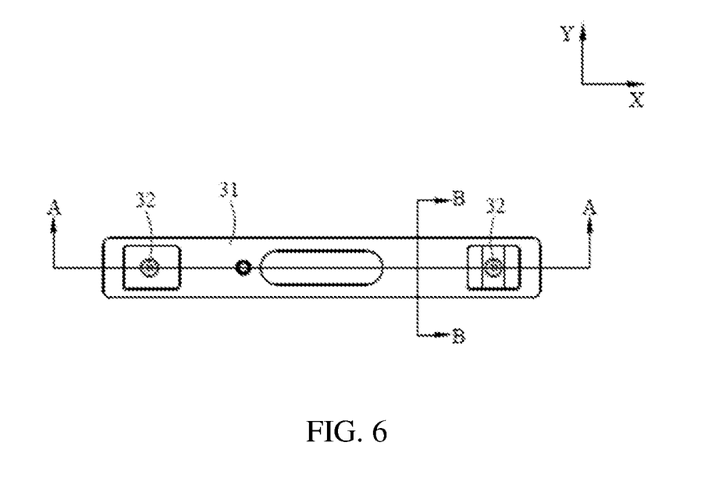
FIG. 6 is a top view of a secondary battery according to some embodiments.
Figure 7:
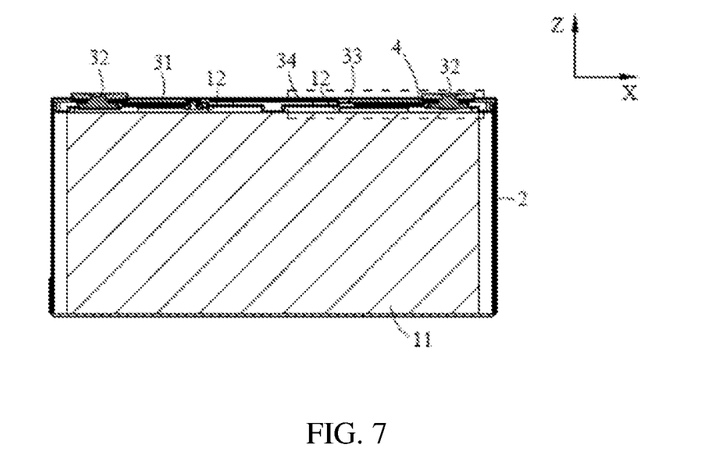
FIG. 7 is a sectional view of the secondary battery shown in FIG. 6 and sectioned along an A-A line.

The electrode assembly 1 is a core member for the secondary battery to implement functions of charging and discharging. The electrode assembly 1 includes a positive electrode plate 13, a negative electrode plate 14, and a separator 15 that separates the positive electrode plate 13 from the negative electrode plate 14. In some embodiments, referring to FIG. 5, the positive electrode plate 13, the separator 15, and the negative electrode plate 14 are sequentially stacked and wound into a whole. In other embodiments, the positive electrode plate 13 and the negative electrode plate 14 are both sheet-like structures and are alternately stacked along a thickness direction thereof.

The positive electrode plate 13 includes a positive current collector and a positive active material layer coated on a surface of the positive current collector. The positive current collector contains a positive coating region and a positive blank region. The positive coating region is overlaid with the positive active material layer, and the positive blank region is not overlaid with the positive active material layer. The negative electrode plate 14 includes a negative current collector and a negative active material layer coated on a surface of the negative current collector. The negative current collector contains a negative coating region and a negative blank region. The negative coating region is overlaid with the negative active material layer, and the negative blank region is not overlaid with the negative active material layer.

In some embodiments, the positive current collector is an aluminum foil, and the positive active material layer contains lithium manganate, lithium iron phosphate, or a ternary material. The negative current collector is a copper foil, and the negative active material layer contains graphite or silicon.

Referring to FIG. 4, as seen from the appearance of the electrode assembly 1, the electrode assembly 1 includes a main body 11 and tabs 12 extending from the main body 11. The main body 11 includes a positive coating region, a positive active material layer, a negative coating region, a negative active material layer, and a separator 15. There are two tabs 12: a positive tab and a negative tab. The positive tab includes a plurality of positive blank regions stacked together, and the negative tab includes a plurality of negative blank regions stacked together.

In some embodiments, referring to FIG. 4, the housing 2 is in a hexahedral shape. In other embodiments, the housing 2 is in a cylindrical shape or other shapes. A cavity is formed inside the housing 2 to accommodate the electrode assembly 1 and an electrolytic solution. The housing 2 forms an opening at one end, and the electrode assembly 1 can be placed into the inner cavity of the housing 2 through the opening. In some embodiments, the housing 2 is made of a conductive metal material such as aluminum or aluminum alloy.

The cap assembly 3 includes a cap plate 31 and electrode terminals 32 disposed on the cap plate 31. The size of the cap plate 31 fits the size of the opening of the housing 2. In some embodiments, the cap plate 31 is a conductive metal plate. The cap plate 31 is connected to the housing 2 by welding and covers the opening of the housing 2. A communicating electrode lead-out hole is disposed on the cap plate 31. The electrode lead-out hole is configured to lead electrical energy of the electrode assembly 1 inside the housing 2 to the outside of the cap plate 31. In some embodiments, the electrode terminals 32 pass through the electrode lead-out hole of the cap plate 31 and are exposed outside the secondary battery.

There are two electrode terminals 32: a positive terminal and a negative terminal. The positive terminal is electrically connected to the positive tab, and the negative terminal is electrically connected to the negative tab.

In some embodiments, the cap plate 31 contains a communicating exhaust hole 311. The cap assembly 3 further includes a rupture disk 34. The rupture disk 34 is disposed on the cap plate 31 and seals the exhaust hole 311. The rupture disk 34 contains a fragile region. When the electrode assembly 1 generates a large amount of gas due to overcharging, a short circuit, or other reasons, air pressure inside the secondary battery increases and bursts the rupture disk 34 in the fragile region. The gas is expelled out of the secondary battery through the exhaust hole 311, thereby preventing the secondary battery from exploding.

The secondary battery according to some embodiments further includes current collection members 4. There are two current collection members 4. One current collection member 4 connects the positive terminal and the positive tab, and the other current collection member 4 connects the negative terminal and the negative tab.

To prevent the cap plate 31 from electrically connecting the positive tab and the negative tab and to reduce short-circuit risks, the cap assembly 3 according to some embodiments further includes an insulation baffle 33. The insulation baffle 33 is disposed at a side of the cap plate 31 and connected to the cap plate 31, where the side is close to the main body 11.

The current collection members 4 are at least partly located between the insulation baffle 33 and the main body 11. The insulation baffle 33 can separate the current collection members 4 from the cap plate 31, thereby avoiding a direct contact between the current collection members 4 and the cap plate 31 and reducing short-circuit risks.

In some embodiments, referring to FIG. 8 and FIG. 14 to FIG. 16, each of the current collection members 4 includes a terminal connection portion 41 and a tab connection portion 42. The terminal connection portion 41 is connected to the electrode terminals 32, and the tab connection portion 42 is connected to one of the tabs 12. The tab connection portion 42 is connected to the tab 12 by welding or by other means, and the terminal connection portion 41 is connected to the electrode terminals 32 by welding or other means.

Referring to FIG. 7 to FIG. 12, the insulation baffle 33 contains a first recess 332. The first recess 332 is recessed against a lower surface 331 of the insulation baffle 33 away from the main body 11. The lower surface 331 of the insulation baffle 33 is oriented toward the main body 11 and is approximately flat. The tab connection portion 42 is at least partly accommodated in the first recess 332.

By disposing the first recess 332, this application downsizes the insulation baffle 33, reduces the space occupied by the insulation baffle 33 in the secondary battery, and increases the energy density of the secondary battery. The tab connection portion 42 is at least partly accommodated in the first recess 332, thereby increasing a distance between the tab connection portion 42 and the main body 11, providing more space for the tabs 12, reducing the risks of inserting the tabs 12 into the main body 11, avoiding short circuits, and improving safety performance.

Figure 10:
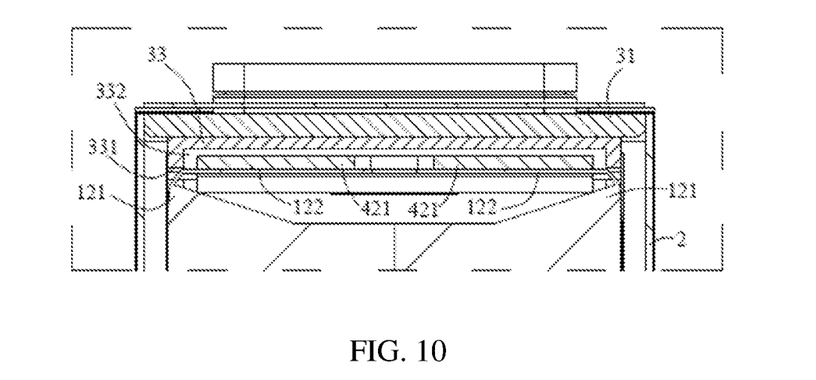
FIG. 10 is a locally enlarged view of a part indicated by a box in FIG. 9.

Referring to FIG. 10, a tab 12 according to some embodiments includes a first part 121 and a second part 122. The first part 121 extends from the main body 11. The second part 122 is connected to one end that is of the first part 121 and that is away from the main body 11, and is bent against the first part 121. The second part 122 is welded to the tab connection portion 42. An end that is of the second part 122 and that is away from the first part 121 may be bent downward. If a distance between the tab connection portion 42 and the main body 11 is too small, the end of the second part 122 is likely to be inserted into the main body 11 to cause a short-circuit risk. However, by disposing the first recess 332, this application increases the distance between the tab connection portion 42 and the main body 11, thereby increasing the spacing between the second part 122 and the main body 11 and reducing the risks of inserting the second part 122 into the main body 11.

Figure 8:
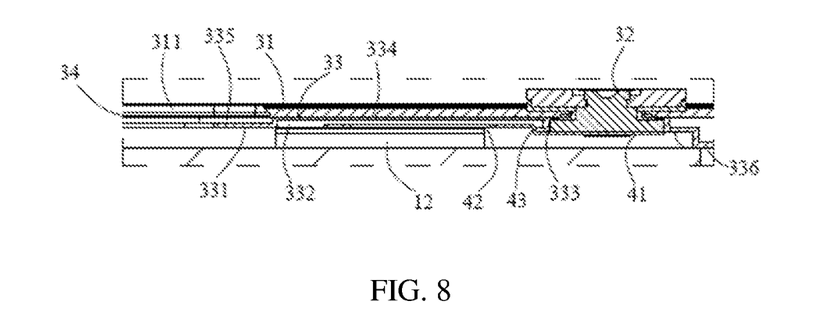
FIG. 8 is a locally enlarged view of a part indicated by a box in FIG. 7.
Figure 9:
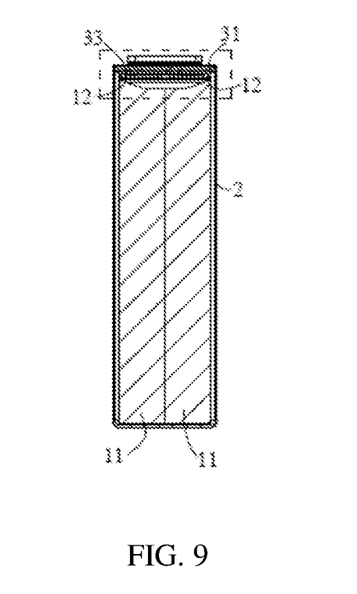
FIG. 9 is a sectional view of the secondary battery shown in FIG. 6 and sectioned along a B-B line.
Figure 14:
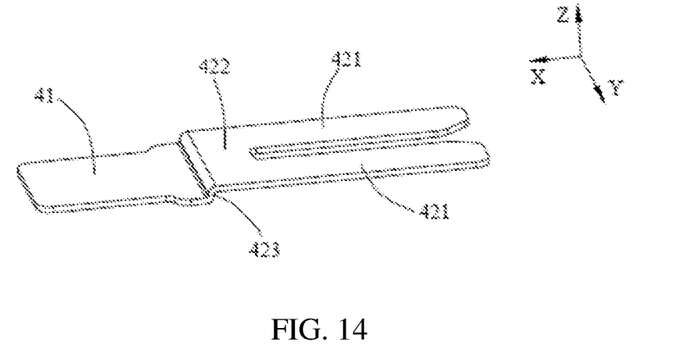
FIG. 14 is a schematic diagram of a current collection member according to some embodiments.
Figure 15:
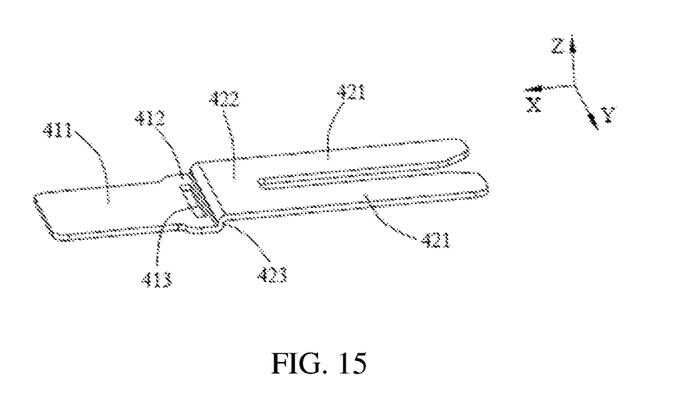
FIG. 15 is a schematic diagram of a current collection member according to other embodiments.
Figure 16:
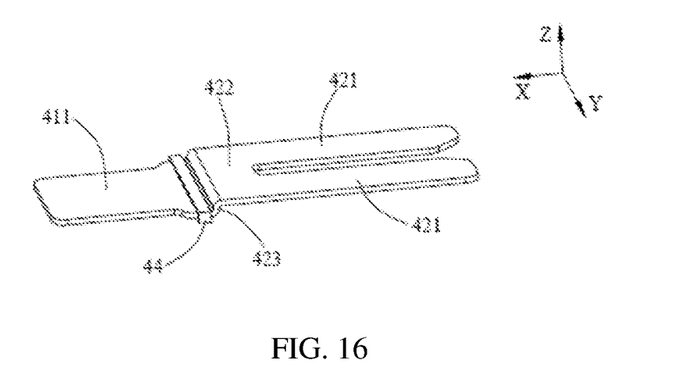
FIG. 16 is a schematic diagram of a current collection member according to still other embodiments.

In some embodiments, referring to FIG. 14 to FIG. 16, both the terminal connection portion 41 and the tab connection portion 42 are flat plate structures. Referring to FIG. 8, the electrode terminals 32 are located at a side of the terminal connection portion 41 without being connected to the tabs 12, where the side is away from the main body 11. Therefore, in contrast with the tab connection portion 42, the distance between the terminal connection portion 41 and the main body 11 may be smaller. In other words, the tab connection portion 42 is farther away from the main body 11 than the terminal connection portion 41.

In some embodiments, referring to FIG. 10, the tab 12 is connected to a side of the tab connection portion 42, where the side is close to the main body 11, so as to simplify the welding between the tab 12 and the tab connection portion 42 as well as the welding between the terminal connection portion 41 and the electrode terminals 32. In addition, if the tab 12 is connected to a side that is of the tab connection portion 42 and that is far away from the main body 11, the first recess 332 needs to be fairly deep in order to accommodate the tab connection portion 42. This will reduce the insulation performance of the insulation baffle 33.

In some embodiments, referring to FIG. 10, a gap exists between the tab connection portion 42 and a bottom face of the first recess 332. By disposing the gap, the assembly of the current collection member 4 and the cap assembly 3 can be simplified. If the tab connection portion 42 fits snugly with the bottom face of the first recess 332, then in assembling the current collection member 4 and the cap assembly 3, the current collection member 4 needs to fit snugly with both the bottom face of the electrode terminals 32 and the bottom face of the first recess 332. Due to process errors, it is difficult to ensure that the current collection member 4 fits well with both bottom faces. Therefore, in this application, a gap is reserved between the tab connection portion 42 and the bottom face of the first recess 332, so that it is enough to ensure that the current collection member 4 fits snugly with the bottom face of the electrode terminals 32. In addition, when the secondary battery vibrates, the tab connection portion 42 can release the stress between the tab 12 and the current collection member 4 through elastic deformation, thereby reducing the risk of rupturing the tab 12.

In some embodiments, referring to FIG. 8 and FIG. 14 to FIG. 16, the current collection member 4 further includes a tilt portion 43. The tilt portion 43 is connected between the terminal connection portion 41 and the tab connection portion 42. The tilt portion 43 tilts against the terminal connection portion 41 away from the main body 11. By disposing the tilt portion 43, the spacing between the tab connection portion 42 and the main body 11 is increased.

In some embodiments, the terminal connection portion 41 is parallel to the tab connection portion 42. Both the terminal connection portion 41 and the tab connection portion 42 are approximately perpendicular to a height direction Z of the secondary battery.

In some embodiments, referring to FIG. 15, the terminal connection portion 41 includes a fixing region 411 and a fuse region 412. The fixing region 411 is connected to the electrode terminals 32. The fuse region 412 is connected between the fixing region 411 and the tilt portion 43. The fuse region 412 is set to work in this way: when the secondary battery is short-circuited, the fuse region 412 blows out to cut off the circuit. In contrast with other parts of the current collection member 4, a passage area of the fuse region 412 is smaller. When the secondary battery is short-circuited, the current on the current collection member 4 increases sharply. When a large current passes through the fuse region 412, heat is generated and blows out the fuse region, thereby cutting off the circuit and reducing safety risks such as fire or explosion of the secondary battery.

In some embodiments, referring to FIG. 15, a via hole is disposed on the terminal connection portion 41. The fuse region 412 includes two fuse sub-regions. The two fuse sub-regions are located at two sides of the via hole respectively. In other embodiments, a groove is disposed on the terminal connection portion 41. The fuse region 412 is located at one side of the groove along a thickness direction of the terminal connection portion 41. In still other embodiments, two notches are disposed on the terminal connection portion 41. The two notches are located at two sides of the fuse region 412 respectively. By disposing the via hole, the groove, or the notches, this application can reduce the passage area of the fuse region 412, thereby implementing the safety protection function of the fuse region 412.

In some embodiments, referring to FIG. 16, the current collection member 4 further includes an insulation strip 44 that wraps around the fuse region 412. When the fuse region 412 blows out, the current collection member 4 is partitioned into two parts. The insulation strip 44 can join the two partitioned parts to avoid relative movement of the two partitioned parts, and prevent the two parts of the current collection member 4 from being lap-jointed again. In some embodiments, a part of the insulation strip 44 is inserted into the via hole of the terminal connection portion 41 and separates the fixing region 411 from the tilt portion 43.

In some embodiments, a part of the insulation strip 44 is accommodated in the first recess 332. In a plane perpendicular to the thickness direction of the terminal connection portion 41, a projection of the insulation strip 44 is located in a projection of a peripheral wall of the first recess 332. A part of the insulation strip 44 is accommodated in the first recess 332, thereby making full use of the first recess 332, saving space, and increasing the energy density of the secondary battery.

In some embodiments, a surface that is of the insulation strip 44 and that is away from the main body 11 is closer to the main body 11 than a surface that is of the tab connection portion 42 and that is away from the main body 11. If the surface that is of the insulation strip 44 and that is away from the main body 11 is farther away from the main body 11 than the surface that is of the tab connection portion 42 and that is away from the main body 11, the first recess 332 needs to be deeper in order to accommodate the insulation strip 44, thereby impairing the insulation performance of the insulation baffle 33.

Figure 11:
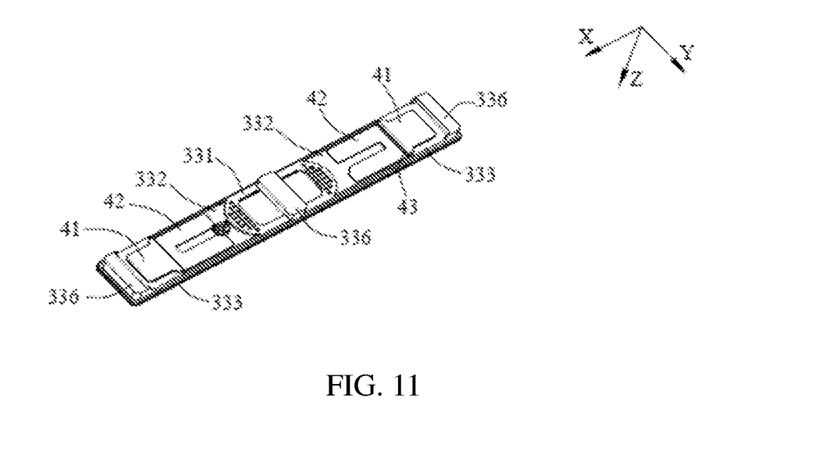
FIG. 11 is a schematic diagram of a cap assembly and a current collection member according to some embodiments.
Figure 12:
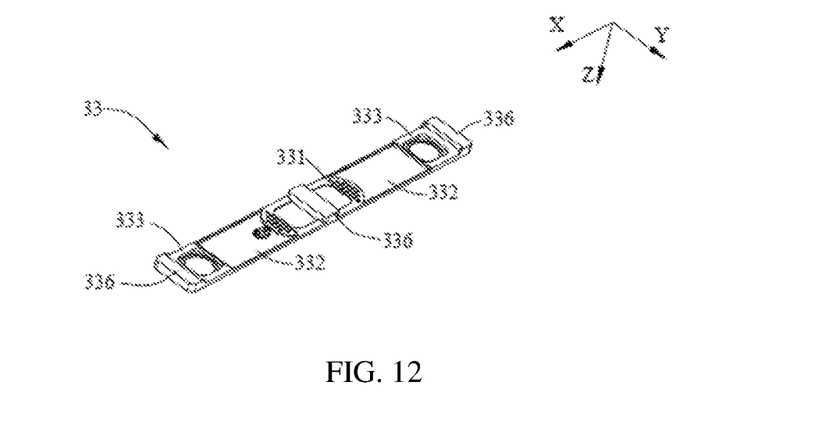
FIG. 12 is a schematic diagram of an insulation baffle according to some embodiments.

In some embodiments, referring to FIG. 11 and FIG. 12, the insulation baffle 33 further contains a first bulge 333 protruding against the lower surface 331. The terminal connection portion 41 is located at a side that is of the first bulge 333 and that is close to the main body 11. The tilt portion 43 is located at a side of the first bulge 333 along the length direction X of the secondary battery. By disposing the first bulge 333, a height difference between the terminal connection portion 41 and the tab connection portion 42 in the height direction Z of the secondary battery can be increased, thereby reducing the risks of lap-jointing the tab 12 to the terminal connection portion 41, and avoiding failure of the safety protection function of fuse region 412.

Figure 13:
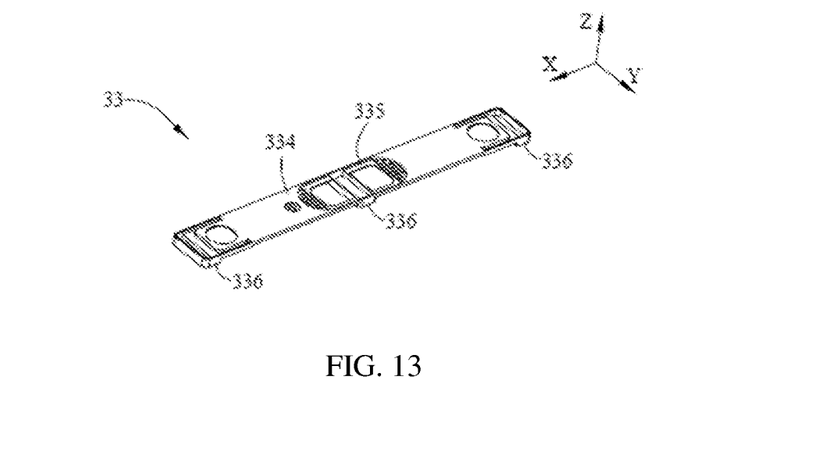
FIG. 13 is another schematic diagram of an insulation baffle according to some embodiments.

In some embodiments, referring to FIG. 13, the insulation baffle 33 contains an upper surface 334 oriented toward the cap plate 31 and a second recess 335 recessed against the upper surface 334. In a plane perpendicular to the thickness direction of the insulation baffle 33, a projection of the rupture disk 34 is located in a projection of a boundary of the second recess 335. Referring to FIG. 8, by disposing the second recess 335, the spacing between the rupture disk 34 and the insulation baffle 33 can be reduced, thereby preventing the insulation baffle 33 from squeezing the rupture disk 34 when deformed, and preventing the rupture disk 34 from being ruptured by the insulation baffle 33.

Along the thickness direction of the insulation baffle 33, the first recess 332 does not overlap the second recess 335, thereby avoiding communication between the first recess 332 and the second recess 335 while ensuring a sufficient depth of both the first recess 332 and the second recess 335.

In some embodiments, referring to FIG. 8 and FIG. 11 to FIG. 13, the insulation baffle 33 further includes a second bulge 336. Along a direction close to the main body 11, the second bulge 336 protrudes against the first bulge 333. The second bulge 336 abuts on the main body 11 to reduce vibration of the main body 11 and reduce the risks of rupturing the tab 12. In an optional embodiment, there are a plurality of second bulges 336.

Although this application has been described with reference to exemplary embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A secondary battery, comprising:
   an electrode assembly, wherein the electrode assembly comprises a main body and tabs extending from the main body;
   a cap assembly, wherein the cap assembly comprises a cap plate, electrode terminals, and an insulation baffle, the electrode terminals are disposed on the cap plate, and the insulation baffle is connected to a side of the cap plate, wherein the side is close to the main body; and
   current collection members, wherein the current collection members are at least partly located between the insulation baffle and the main body, and each of the current collection members comprises a tab connection portion connected to one of the tabs, a tilt portion and a terminal connection portion,
   wherein the insulation baffle contains a first recess, a first bulge and a second bulge, wherein the first recess is recessed against a lower surface of the insulation baffle away from the main body, and the tab connection portion is at least partly accommodated in the first recess;
   wherein the first bulge protrudes against the lower surface, and along the thickness direction of the insulation baffle, the terminal connection portion is located on a side of the first bulge, wherein the side is close to the main body, and the tilt portion is located on a side of the first bulge along a length direction of the secondary battery;
   wherein along a direction close to the main body, the second bulge protrudes against the first bulge.

2. The secondary battery according to claim 1, wherein the terminal connection portion is connected to the electrode terminals, both the terminal connection portion and the tab connection portion are flat plate structures, and the tab connection portion is farther away from the main body than the terminal connection portion.

3. The secondary battery according to claim 1, wherein the tab is connected to a side of the tab connection portion, wherein the side is close to the main body.

4. The secondary battery according to claim 1, wherein a gap exists between the tab connection portion and a bottom face of the first recess.

5. The secondary battery according to claim 2, wherein
   wherein the tilt portion is connected between the terminal connection portion and the tab connection portion, and the tilt portion tilts against the terminal connection portion away from the main body.

6. The secondary battery according to claim 2, wherein the terminal connection portion is parallel to the tab connection portion.

7. The secondary battery according to claim 5, wherein the terminal connection portion comprises a fixing region and a fuse region, the fixing region is connected to the electrode terminals, and the fuse region is connected between the fixing region and the tilt portion.

8. The secondary battery according to claim 7, wherein the current collection member further comprises an insulation strip that wraps around the fuse region; and
   a part of the insulation strip is accommodated in the first recess, and a surface that is of the insulation strip and that is away from the main body is closer to the main body than a surface that is of the tab connection portion and that is away from the main body.

9. A battery module, comprising a secondary battery, wherein the secondary battery is plural in number and the secondary battery comprises:
   an electrode assembly, wherein the electrode assembly comprises a main body and tabs extending from the main body;
   a cap assembly, wherein the cap assembly comprises a cap plate, electrode terminals, and an insulation baffle, the electrode terminals are disposed on the cap plate, and the insulation baffle is connected to a side of the cap plate, wherein the side is close to the main body; and
   current collection members, wherein the current collection members are at least partly located between the insulation baffle and the main body, and each of the current collection members comprises a tab connection portion connected to one of the tabs, a tilt portion and a terminal connection portion,
   wherein the insulation baffle contains a first recess, a first bulge and a second bulge, wherein the first recess is recessed against a lower surface of the insulation baffle away from the main body, and the tab connection portion is at least partly accommodated in the first recess;

wherein the first bulge protrudes against the lower surface, and along the thickness direction of the insulation baffle, the terminal connection portion is located on a side of the first bulge, wherein the side is close to the main body, and the tilt portion is located on a side of the first bulge along a length direction of the secondary battery;

wherein along a direction close to the main body, the second bulge protrudes against the first bulge.

10. A device using a secondary battery as a power supply, wherein the device comprises the secondary battery, and the secondary battery comprises:

an electrode assembly, wherein the electrode assembly comprises a main body and tabs extending from the main body;

a cap assembly, wherein the cap assembly comprises a cap plate, electrode terminals, and an insulation baffle, the electrode terminals are disposed on the cap plate, and the insulation baffle is connected to a side of the cap plate, wherein the side is close to the main body; and current collection members, wherein the current collection members are at least partly located between the insulation baffle and the main body, and each of the current collection members comprises a tab connection portion connected to one of the tabs, a tilt portion and a terminal connection portion, wherein the insulation baffle contains a first recess, a first bulge and a second bulge, wherein the first recess is recessed against a lower surface of the insulation baffle away from the main body, and the tab connection portion is at least partly accommodated in the first recess;

wherein the first bulge protrudes against the lower surface, and along the thickness direction of the insulation baffle, the terminal connection portion is located on a side of the first bulge, wherein the side is close to the main body, and the tilt portion is located on a side of the first bulge along a length direction of the secondary battery;

wherein along a direction close to the main body, the second bulge protrudes against the first bulge.

* * * * *